United States Patent Office 2,774,675
Patented Dec. 18, 1956

2,774,675

GLASS COMPOSITION

Games Slayter, Newark, Ohio, assignor to Owens-Corning Fiberglas Corporation, a corporation of Delaware No Drawing. Application February 25, 1953,
Serial No. 338,913

8 Claims. (Cl. 106—50)

This invention relates to a glass composition and particularly to such a composition comprising a multiphase system, including one or more components having a high modulus of elasticity and one or more components having a relatively low modulus of elasticity. It relates more particularly to such compositions in massive or fibrous form having exceptionally high strengths and resistance to propagation of cracks.

In the past, two phase systems having a component with a high modulus of elasticity and another component with a low modulus of elasticity have been used to provide high strength structures such as that illustrated by a fibrous glass reinforced resin fishing rod and the like. Other examples of such structures are steel rod reinforced concrete and fibrous metal reinforced glass or ceramic structures. In these prior two-phase structures the two components were generally difficultly separable one from another and were discernible to the human eye. For instance, in reinforced concrete when a rupture is produced in the product, the steel rods are easily recognized as such at the point of rupture in the product. These structures wherein the separate phases are discernible to the human eye will be referred to as macro multiphase systems.

Over the years the development of glass has been aimed toward producing the highest degree of transparency with the least interference to the passage of light rays through the glass. As a result, the glass has been produced in a highly homogeneous form and this very homogeneity defeats any chance of using glass as a structural material. The homogeneity apparently introduces into the glass a tendency toward fracture once the surface of the glass is seriously marred so that while the glass may have quite high tensile strength, it is unsuitable as a structural material because of its tendency to fracture and shatter under impact and under loading. For instance, a bottle if it were made of the amount of glass dictated by the tensile strength of the glass, could be as thin as an electric light bulb. However, because of the tendency of the material to fracture wherever there is a surface flaw, a great deal more material must be used than that dictated by the tensile strength of the material with the result that a milk bottle or other glass container may be 10 or 20 times as heavy as it need be if glass were a reliable structural material.

Compositions having unusually high strengths in addition to other improved properties are provided by glass systems in which the phases are submicroscopic in nature. The high strengths are believed to be attributed to the high-low modulus principle which operates in such materials as bamboo, Carboloy and the like. These materials are not scratch and bruise sensitive because cracks can not readily propagate through the low modulus phase since the high modulus phase takes the load while the low modulus phase which acts as a flexible cement is not stressed to its ultimate.

Certain siliceous compositions are believed to be structures having a high and a low modulus phase on a submicroscopic scale. The electron microscope shows certain glasses to comprise chains of silica tetrahedra. In drawing these glasses into fibrous form the short silica tetrahedra chains are aligned parallel to the axis of the fibre. These chains are not crystals but rather are much smaller than crystal structure according to X-ray examinations.

The silica tetrahedra threads are the high modulus phase while the usual glass fluxes act as the cementing low modulus phase. Therefore, fibres of silica glass may well be strings of relatively high modulus silica in a flux matrix such as calcia. These siliceous materials do not exhibit resistance to scratching and bruising and it is believed that this may be true only because the moduli of the two phases is not sufficiently different. Silica also reacts with water which is of course undesirable in a structural material.

It is proposed to replace the silica in such a micro phase structure with another material which has a very high modulus as compared to silica in order to use the high-low modulus principle to greater advantage. The high modulus phase should preferably be impervious to attack by water as should the flux or matrix phase.

The final structure when in the fibrous form may comprise submicroscopic crystallites of the high modulus phase aligned lengthwise to the fiber and intermixed with a low modulus matrix phase.

It is an object of this invention to produce a structural material having the chemical inertness of glass and the high strength and impact strength of wood and metal.

It is an object to provide a structural glass having greatly superior properties including a very high modulus of elasticity.

It is a further object to provide a silica-free glass which is adaptable for being manufactured into fibrous form.

It is also an object to provide a glass having high abrasion resistance and high scratch resistance.

The objects of the invention are attained by providing a glass composition comprising, (1) a network former or glass forming ingredient; and (2) a flux or modifier. In one embodiment of the invention the so-called network former is preferably one having a very high modulus of elasticity in the order of from 40,000,000 to 75,000,000, while the flux or modifier has a relatively low modulus of elasticity of about 10,000,000 to 15,000,000. Minor proportions of other ingredients or components may be added as desired as will be illustrated in the examples to follow.

It is known that alumina in the crystalline form has a very high modulus of elasticity of from about 50,000,000 to 56,000,000 depending on the angle of orientation of the crystal. In order to utilize this high modulus of elasticity, glass compositions have been formulated in which alumina replaces silica as one of the major components of the glass batch. Along with the major proportion of alumina or other high modulus network former, is added a large proportion of flux such as calcia or other similar modifier having a relatively low modulus of elasticity. If it is desired to have a high oxygen content in the glass compositions of this invention, stabilizing oxides such as tin oxide, lead oxide or the like may be added. Reducing agents likewise may be added either by themselves or along with other of the well-known glass making ingredients including oxides of zinc, titanium, zirconium, antimony, arsenic, lead, calcium and the like.

In accordance with the present invention, the two-phase material is made of metallic oxides which are fused together but which have differences in moduli of elasticity to such extent that the resulting two-phase material displays exceedingly high resistance to fracture with a resultant high impact strength and reliability as a structural material.

As an example of the material of the present invention, calcium oxide and aluminum oxide are melted together in proportions by weight of about 50% calcium oxide and 50% aluminum oxide. The resulting product of fusion is a glassy material which has enough of the ordinary characteristics of glass to be workable. This is quite an achievement because there are literally millions of combinations of metallic oxides which can be fused but the products of fusion do not have any of the characteristics present in normal glasses. Most importantly there is no working range or stage, that is, the stage in which the glass is fluid and maintains its glassy nature without crystallization. Such products of fusion are of no real value in a search for an improved structural material because they could not be converted to a desired shape before they had crystallized.

In the combination of materials above mentioned, the alumina has a modulus of elasticity in the order of about 55,000,000 while the calcium oxide has a considerably lower modulus of elasticity or one in the order of about 12,000,000. In other words, the ratio of the moduli of elasticity is in the order of about 5 to 1. With this difference the material displays many of the characteristics of two-phase systems such as wood, steel, and reinforced plastics.

In further embodiments of the invention glass compositions are prepared according to the following batch recipes, the parts being by weight:

*Example I*

$Al_2O_3$ ---------------------------------------- 52.5
CaO ---------------------------------------- 35
$SnO_2$ ---------------------------------------- 12.5

The above ingredients are mixed and fused together at about 2700° F. in a suitable furnace to form a somewhat crystalline melt.

*Example II*

$Al_2O_3$ ---------------------------------------- 50
CaO ---------------------------------------- 35
$SnO_2$ ---------------------------------------- 15

These ingredients are melted to form a glass as in Example I.

*Example III*

$Al_2O_3$ ---------------------------------------- 50
CaO ---------------------------------------- 37.5
$SnO_2$ ---------------------------------------- 12.5

These ingredients are treated as those in Example I. The melt tends to be crystalline.

*Example IV*

$Al_2O_3$ ---------------------------------------- 50
CaO ---------------------------------------- 40
$SnO_2$ ---------------------------------------- 10

The same results are obtained with this glass batch as in Examples I to III, inclusive.

*Example V*

$Al_2O_3$ ---------------------------------------- 47.5
CaO ---------------------------------------- 45
$SnO_2$ ---------------------------------------- 7.5

These ingredients are melted and fused together at a temperature of about 2700° F. The melt has little crystallinity and very clear fibers are produced from the glass batch.

*Example VI*

$Al_2O_3$ ---------------------------------------- 47.5
CaO ---------------------------------------- 42.5
$SnO_2$ ---------------------------------------- 10

This melt has very little tendency to crystallize and clear fibers are producible therefrom.

*Example VII*

$Al_2O_3$ ---------------------------------------- 47.5
CaO ---------------------------------------- 40
$SnO_2$ ---------------------------------------- 12.5

These ingredients are melted at a temperature of 2700° F. and formed into fibers. This glass batch is one of the best, both in respect to having a crystal-free melt and clear, relatively easy to produce fibers.

*Example VIII*

$Al_2O_3$ ---------------------------------------- 47.5
CaO ---------------------------------------- 37.5
$SnO_2$ ---------------------------------------- 15

This glass composition has some tendency to crystallize when in the molten state and produces clear fibers.

*Example IX*

$Al_2O_3$ ---------------------------------------- 47.5
CaO ---------------------------------------- 35
$SnO_2$ ---------------------------------------- 17.5

This glass batch provides a melt which tends to crystallize somewhat when in the molten state.

*Example X*

$Al_2O_3$ ---------------------------------------- 45
CaO ---------------------------------------- 37.5
$SnO_2$ ---------------------------------------- 17.5

This glass batch provides a melt having little tendency to crystallize and can be formed into clear fibers.

*Example XI*

$Al_2O_3$ ---------------------------------------- 45
CaO ---------------------------------------- 40
$SnO_2$ ---------------------------------------- 15

This glass composition provides a melt which has little tendency to crystallize and provides fibers which are not opaque but rather quite clear.

*Example XII*

$Al_2O_3$ ---------------------------------------- 45
Cao ---------------------------------------- 42.5
$SnO_2$ ---------------------------------------- 12.5

This is one of the better glass compositions with the melt being clear and the fibers being likewise very clear.

*Example XIII*

$Al_2O_3$ ---------------------------------------- 45
CaO ---------------------------------------- 45
$SnO_2$ ---------------------------------------- 10

This glass composition provides a melt which tends to crystallize somewhat, however, clear fibers are produced therefrom.

*Example XIV*

$Al_2O_3$ ---------------------------------------- 42.5
CaO ---------------------------------------- 40
$SnO_2$ ---------------------------------------- 17.5

This melt tends to crystallize and clear fibers can be produced from the melt.

*Example XV*

$Al_2O_3$ ---------------------------------------- 42.5
CaO ---------------------------------------- 42.5
$SnO_2$ ---------------------------------------- 15

This melt crystallizes somewhat, however, clear fibers can be produced therefrom.

*Example XVI*

$Al_2O_3$ ---------------------------------------- 42.5
CaO ---------------------------------------- 45
$SnO_2$ ---------------------------------------- 12.5

This glass composition provides a melt that crystallizes somewhat.

*Example XVII*

| | |
|---|---|
| Al₂O₃ | 42.5 |
| CaO | 47.5 |
| SnO₂ | 10 |

This glass composition provides a melt that tends to crystallize.

Although some of the fibers produced from the above glass recipes are opaque, it does not follow that these are in any way inferior to fibers that are clear in a structural sense. As stated before, in the past most glasses have been formulated with the intention of providing clear, transparent products, however, here such criteria may not necessarily prevail.

From the above examples and the comments thereon, it is apparent that glass compositions having from 40 to 50 parts by weight of a network former such as alumina and from 35 to 50 parts by weight of a flux or modifier such as calcia along with from 5 to 20 parts by weight of a stabilizing oxide such as tin oxide are suitable for the purposes of this invention. In addition to the ingredients listed, minor proportions of other ingredients may be added as desired. Preferred ranges are from 44 to 48 parts alumina, from 37.5 to 45 parts calcia and from 10 to 15 parts of stabilizing metallic oxide.

It has been discovered that such glass compositions as those in Examples I to XVII have a Young's modulus of elasticity considerably greater than that of most glass compositions containing silica. The modulus of these compositions has been measured by the sonic method and found to be as high as 16,000,000 while the greater proportion of glass compositions have a modulus of elasticity of from 10,000,000 to 12,000,000.

The above glass compositions are very hard, having a hardness on the Moh's scale of from 6 to 7 while most glasses have a hardness of from 5 to 6. As a result of this hardness, the glasses of this invention are very scratch insensitive and have, in addition, very high abrasion resistance. In addition to these properties, it has been discovered that the resulting glass compositions tend to be resistant to propagation of cracks through the glass itself. It is believed that this results from a true two phase system which comprises the low modulus component calcia and the high modulus component alumina. Although the two components within this system are not discernible to the eye, it is believed that the two components nevertheless exist and provide the unusually high strength properties. Since the glasses of this invention have the above properties, it is possible to use them as structural materials either alone or in combination with other materials.

Another advantage of these glass compositions lies in the fact that the glass has a high oxygen content and as a result coloring agents are maintained in a high state of oxidation which results in very clear colors. The compositions of this invention are readily adaptable for use both in the massive state and in the fibrous state.

In place of the alumina in the above examples, such network formers as titania or zirconia may be used. Any metallic oxide having a high modulus of elasticity, i. e., from 40 to 75,000,000 may be used. Although calcia has been disclosed as the flux or matrix component, it should be understood that any oxide having a relatively low modulus of about 10 to 15,000,000 may be used for the purposes of this invention.

Other fluxes which may be used in addition to calcia are boric oxide, soda, and the like.

It is believed that the tin oxide acts as a stabilizing oxide, supplying oxygen which may be necessary to allow the tetrahedral coordination of the alumina ion in the glass. If each aluminum atom has four oxygen atoms surrounding it, it tends to be more stable in the glass composition.

Other stabilizing oxides may be added as a partial or total replacement for tin oxide. These oxides include lead oxide, antimony oxide, arsenic oxide, indium oxide, bismuth oxide, tellurium oxide, selenium oxide or an oxidizing substance such as the nitrate or sulphate of calcium, aluminum, tin or ammonium.

Further examples of glass compositions embodied in this invention are as follows, parts being by weight:

*Example XVIII*

| | |
|---|---|
| TiO₂ | 50 |
| CaO | 50 |

*Example XIX*

| | |
|---|---|
| TiO₂ | 45 |
| CaO | 45 |
| SnO₂ | 10 |

High and low modulus phase glass compositions have been described; however, it is obvious that glass compositions which are multicomponent or multiphase, i. e. having one or more high and one or more low modulus phases, come within the scope of this invention as described. The glass compositions provided by this invention are unique in that there is no silica present and in that they have very high strengths and greatly increased hardness.

Although specific embodiments of the invention have been disclosed, the invention is not to be limited thereby; rather obvious modifications and variations may be made within the spirit and scope of the following claims.

I claim:

1. A glass composition consisting essentially of from 40 to 50 parts by weight alumina, from 35 to 50 parts by weight calcia, and from 5 to 20 parts by weight tin oxide.

2. The composition of claim 1 in fibrous form.

3. A glass composition consisting essentially of from 44 to 48 parts by weight alumina, from 37.5 to 45 parts by weight calcia, and from 10 to 15 parts by weight tin oxide.

4. The composition of claim 3 in fibrous form.

5. A glass composition consisting essentially of 47.5 parts by weight alumina, 40 parts by weight calcia and 12.5 parts by weight tin oxide.

6. The composition of claim 5 in the fibrous form.

7. A glass composition consisting essentially of 45 parts by weight alumina, 42.5 parts by weight calcia and 12.5 parts by weight tin oxide.

8. The composition of claim 7 in the fibrous form.

References Cited in the file of this patent

UNITED STATES PATENTS

| | | |
|---|---|---|
| 1,736,642 | Beaudry | Nov. 19, 1929 |
| 2,090,098 | Berger et al. | Aug. 17, 1937 |
| 2,172,839 | Francis et al. | Sept. 12, 1939 |
| 2,240,327 | Elenbaas et al. | Apr. 29, 1941 |
| 2,252,495 | Dusing | Aug. 12, 1941 |
| 2,486,812 | Weyl | Nov. 1, 1949 |

FOREIGN PATENTS

| | | |
|---|---|---|
| 165,052 | Great Britain | 1921 |
| 495,654 | Great Britain | 1938 |